US006550329B2

(12) United States Patent
Watson (10) Patent No.: US 6,550,329 B2
(45) Date of Patent: Apr. 22, 2003

(54) HIGH Q ANGULAR RATE SENSING GYROSCOPE

(75) Inventor: William S. Watson, Eau Claire, WI (US)

(73) Assignee: Watson Industries, Inc., Eau Claire, WI (US)

( * ) Notice: Subject to any disclaimer, the term of this patent is extended or adjusted under 35 U.S.C. 154(b) by 196 days.

(21) Appl. No.: 09/880,433

(22) Filed: Jun. 13, 2001

(65) Prior Publication Data

US 2001/0042403 A1 Nov. 22, 2001

Related U.S. Application Data

(62) Division of application No. 09/397,718, filed on Sep. 16, 1999, now Pat. No. 6,272,925.

(51) Int. Cl.[7] .............................................. G01C 19/00
(52) U.S. Cl. ................................................... 73/504.13
(58) Field of Search ...................................... 73/504.13

(56) References Cited

U.S. PATENT DOCUMENTS 6,151,964 A * 11/2000 Nakajima ................ 73/504.13

* cited by examiner

Primary Examiner—Richard A. Moller
(74) Attorney, Agent, or Firm—Moore & Hansen (57) ABSTRACT

A structure and arrangement for improving the accuracy and efficiency of an angular rate sensing gyroscope is herein disclosed. Voltage pick-off conductors are applied to an area of the surface of a resonating element of an angular rate sensing gyroscope that is subject to substantially zero stress when the gyroscope is rotationally stationary. Actuator conductors are similarly applied to a resonating element at a location bounded by areas of the resonating element subject to substantially uniform levels of stress when the gyroscope is rotationally stationary. A method for improving the voltage response of a piezoelectric resonating element is also disclosed.

4 Claims, 8 Drawing Sheets

HIGH Q ANGULAR RATE SENSING GYROSCOPE

CROSS REFERENCE TO RELATED APPLICATIONS

This application is a Divisional Application of U.S. patent application Ser. No. 09/397,718 of William S. Watson filed Sep. 16, 1999, now U.S. Pat. No. 6,272,925 entitled High Q Angular Rate Sensing Gyroscope.

FIELD OF THE INVENTION

The present invention is drawn to an angular rate sensor of the type utilizing an oscillating resonating element. More specifically, the present invention is drawn to the shape and placement of actuators and pick-offs upon resonating elements of rate gyroscopes.

BACKGROUND OF THE INVENTION

Rate gyroscopes operate on the principle of inertia. Standing waves are excited in a resonating element to produce a desired mode of oscillation having a predetermined number of nodes. The oscillations have an amplitude, a frequency, and an inherent oscillatory inertia that is independent of the linear and rotational inertia of the gyroscope itself. When the resonating element is rotated about its sensing axis, the oscillations will in large part maintain their absolute spatial orientation. However, in maintaining their absolute spatial orientation, the nodes that define the desired mode of oscillation will rotate with respect to the physical structure of the resonating element. This rotation of the nodes is proportional to the physical rotation applied to the resonating element. Taking advantage of this phenomena, it is possible to measure the rate of rotation and determine the magnitude and direction of the rotation that the resonating element has been subjected to.

Solid state gyroscopes based on the principle described above are capable of sensing rotation only, and then only about a single axis. To obtain information sufficient to determine the relative attitude of a body, it is necessary to group at least three such gyroscopes in an orthogonal relationship covering the x, y, and z Cartesian axes.

DESCRIPTION OF PRIOR ART

The terms "gyroscope" and "angular rate sensor" as used herein are interchangeable and refer to both spinning and oscillating or vibrating type devices. One well known type of angular rate sensor comprises the use of piezoelectric ceramic crystals in a paired tuning fork arrangement. Examples of this type of angular rate sensor are shown in U.S. Pat. Nos. 4,628,7734 to Watson and 4,671,112 to Kimura. In this type of sensor a pair of drive elements are energized to induce a controlled vibration therein. The drive elements are arranged such that the oscillations induced are in a single plane. Sensing elements are coupled to the ends of the drive elements and oscillate along with the drive elements in the single plane. However, the sensing elements are arranged so that flexure of the sensing elements will take place only in a plane perpendicular to the plane of vibration of the driving elements. The application of a rotational force to the vibrating sensor elements in the perpendicular plane induces a sensed output signal that may be monitored and filtered to characterize the angular rate of change of the sensing object to which the sensing elements are mounted. Though the tuning fork type of angular rate sensor attempts to isolate the sensing elements from the drive elements by rotating the sensing elements 90□ from the drive elements, small bending forces due to the oscillation of the drive elements are imposed upon the sensing elements. These undesirable bending forces create voltage signals which may degrade the signal to noise ratio of the voltage output of the sensing elements and may indicate falsely that the angular rate sensor is being rotated about its sensitive axis.

Figure 1:
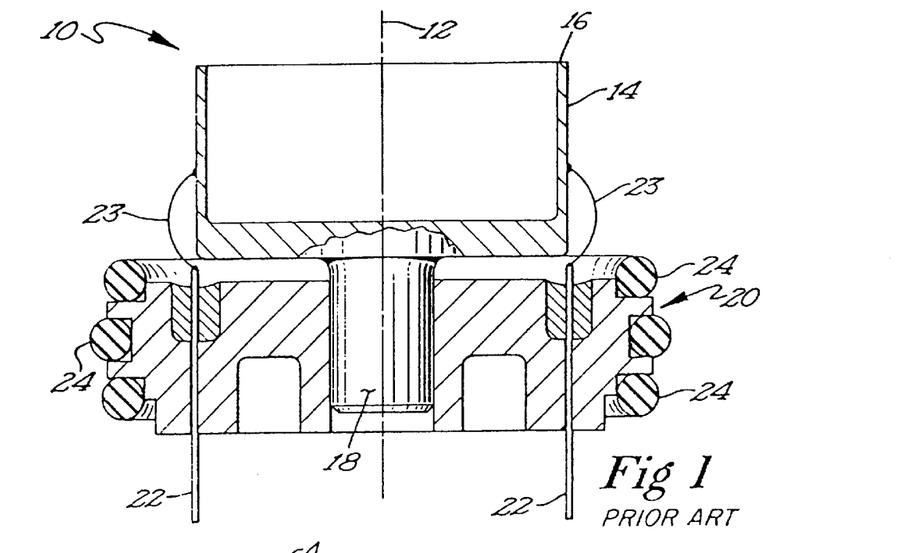
FIG. 1 is a cross-sectional view of an axi-symmetric shell of the prior art used as an resonating element in a rate integrating gyroscope shown in relation to, a chassis for supporting the shell.

Another type of angular rate sensor utilizes a cup or bell shaped resonator which is forced to oscillate in known manner. One such sensor is shown in U.S. Pat. No. 5,218,867 to Varnham, et al. See FIGS. 1–3. The cup portion of the Varnham resonator is supported upon a stem which is in turn secured to the chassis of the sensor. Varnham utilizes a pair of actuators arranged at an angle of 45□ to one another to induce a desired mode of oscillation in the resonator. The resonator itself is fabricated from a piezoelectric ceramic material and the actuators are thin or thick film conductive materials that are applied directly to the wall of the resonator in a known manner. In order to sense a rate of rotation, the Varnham device provides a pair of pick-offs, identical in construction to the actuators and applied to the resonator in diametric opposition to the pair of actuators. An actuator drive network acts through the actuators to impose a phase locked voltage waveform upon the resonator, thereby causing the resonator to assume a desired mode of oscillation. The pick-offs sense variations in the desired mode of oscillation caused by angular rotation of the sensor. The signals from the pick-offs are demodulated using the imposed driving voltage waveform. The resulting signal is proportional to the angular rate of rotation of the sensor and by integrating the resulting signal over time, one can determine the actual angle through which the sensor has rotated. The angle of rotation is, in turn, used by the actuator drive network to modify the waveform being imposed upon the resonator to bring the resonator back to the desired mode of oscillation.

Problems with angular rate sensors of the type patented by Varnham include a relatively low Q value, low sensitivity, and low accuracy. For instance, the actuators and pick-offs of prior art devices such as the Varnham device, are uniformly large patches of conductive material applied to the resonator in a manner such that the actuators and pick-offs span a wide range of stress gradients in the resonator walls. Because piezoelectric voltages are generally proportional to the stress in a piezoelectric material, a voltage applied across a number of stress gradients causes the areas of differing stress within the piezoelectric material to work against one another, thereby reducing the Q value of the resonator. Likewise, a voltage measured across a wide-ranging stress gradient is more likely to be an average of the voltages produced in the resonator at each of the stress gradients that a pick-off crosses.

In addition, the application of actuators and pick-offs across stress gradients, in combination with non-uniform voltage responses in the piezoelectric materials, may make it more difficult to force the resonator to oscillate in its desired mode. In order to ensure the proper oscillation, much more energy is expended in the correction of the vibrations, thereby lowering the Q value of the resonator. The Q value of a vibrating system is the ratio of the magnitude of the total energy of a vibrating system to the magnitude of the energy added to the system during each oscillatory cycle.

Figures 2, 3:
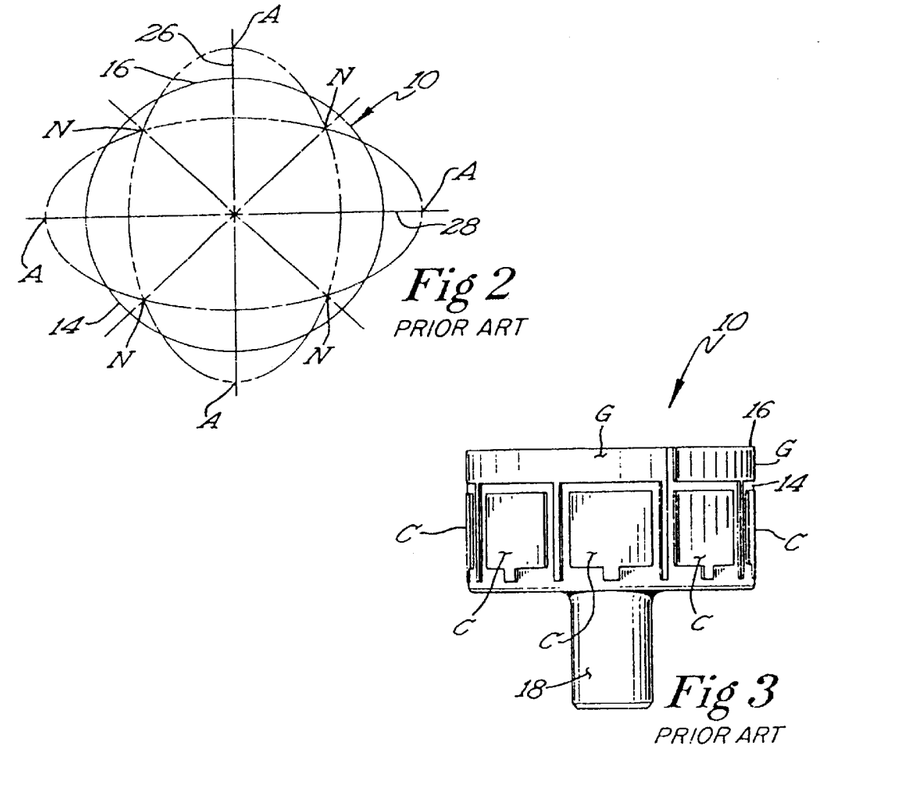
FIG. 2 is a schematic illustration of the preferred mode of oscillation of the upper edge of the axi-symmetric shell of FIG. 1.
FIG. 3 is an elevation of the prior art axi-symmetric shell of FIG. 1 illustrating the placement of conductors C thereon.

The large size of the conductive patches of the pick-offs contributes to the low accuracy of rate gyroscopes of the type patented by Varnham. FIG. 3 illustrates prior art pick-off and actuator conductors C having large surface areas. Piezoelectric materials are not uniform in their voltage response and therefore it is frequently the case that a pick-off having a large surface area will sense net voltages skewed by an uneven voltage response of the piezoelectric material. The larger the area of coverage of the pick-off, the more likely it is that the voltages sensed by the pick-offs will comprise a signal due to uneven voltage response of the piezoelectric material of the resonator. And because the actual voltages sensed by the pick-offs are quite small, voltage signal components due to uneven voltage responses frequently alter the signal to noise ratio of the sensed voltages to an extent that makes it difficult to determine accurately the rate and magnitude of rotation of the gyroscope. Further more, because it is also frequently the case that the voltage response of respective areas of the piezoelectric materials that make up a resonator may vary independently with changes in the ambient temperature of the operating environment of the gyroscope, the noise to signal ratio of the sensed voltages may become further degraded.

In general, piezoelectric materials are made up of many individual crystals that have been sintered together and given a particular polarity by the application of a strong DC voltage. Where this polarization is performed over a discrete area of the piezoelectric material, such as over the surface of the resonator covered by the conductive patches of the actuators and pick-offs, the polarization of the material at the edges of the discrete area will not be in the desired direction and will therefore generate irregular voltage responses. In addition, it is not uncommon that the piezoelectric material of the resonator will be subject to irregular stresses or flexure. The combination of irregular stresses or flexure with uneven edge polarization, may cause severe fluctuations in the accuracy and sensitivity of the angular rate sensor and may also lower the Q value of the system.

In addition to the problems mentioned above, it is known to make electrical connections between actuators and pick-offs on a resonator and the associated sensing and filtering electronics, using fine wires as connectors. See FIG. 1. These wires are connected at each end but otherwise unsupported therebetween. The wire used in making these connections must be extremely fine so as to avoid interfering with the vibrations set up in the resonator. The small size of the connection wires makes them weak and prone to frequent failure due to applied forces and internal stresses resulting from the ultrasonic wedge bonding processes that are typically used to make such small electrical connections. In addition, the use of solder or solder-like materials on the resonator at the physical contact between the wire and the resonator tend to interfere with the inducement and maintenance of the desired mode of oscillation, thereby lowering the Q factor of the system.

OBJECTIVES OF THE INVENTION

Therefore, it is an objective of the present invention to provide a uniformly polarized piezoelectric resonator. It is another object of the present invention to improve the accuracy and Q value of the resonator by providing a plurality of actuators that are contoured to conform to areas of substantially uniform stress in the walls of the resonator and which are located on the resonator so as to maximize the flexure of the resonator wall per unit volt applied to the resonator. Similarly, it is yet another object of the invention to suppress unwanted modes of oscillation through the proper arrangement of actuators and pick-offs on the piezoelectric resonator. Another objective of the present invention is to provide a pick-off structure which minimizes error due to undesirable stresses and deformations present in a resonating element. Another objective is to reduce the inherent variations in output voltage sensed at the nodal pick-offs due to fluctuations in the environmental conditions in which the gyroscope is operating. Yet another objective is to provide more reliable electrical connections between the actuators and pick-offs and the electronics used to filter and process the electrical signals received from and sent to the actuators and pick-offs, respectively.

SUMMARY OF THE INVENTION

With the aforesaid background in mind, improved pick-off and actuator conductors have been developed which minimize error in the angular rate of change reported by an angular rate sensing gyroscope. Furthermore, angular rate sensing gyroscopes incorporating the present invention have a more uniform voltage response and are provided with conductive leads that are relatively resistant to damage.

An angular rate sensing gyroscope constructed according to the present invention comprises a resonating element that is arranged and constructed to output voltage signals proportional to a level of stress induced therein, means for imposing a predetermined mode of oscillation upon the resonating element, a voltage pick-off conductor on the surface of the resonating element that is arranged and constructed to sense stress-induced voltage signals outputted by the resonating element, and means for processing the voltage signals sensed by the pick-off conductor. The pick-off is applied to an area of the surface of the resonating element where the stress in the shell wall is minimal and preferably substantially zero when the gyroscope is rotationally stationary. Consequently, any voltage signals sensed by the pick-off conductor are indicative of the rate at which the gyroscope is rotating.

A resonating element according to the present invention is characterized by the ability to vibrate in a predetermined mode of oscillation defined by a plurality of stable nodes and anti-nodes. Actuator conductors of the present invention are applied to the surface of said resonating element substantially at the anti-nodes and pick-off conductors are applied substantially at the nodes. The advantageous arrangement of the actuator and pick-off conductors on the anti-nodes and nodes, respectively, results in a more sensitive and efficient angular rate sensing gyroscope.

The actuator conductors of the present invention are applied to the resonating element at predetermined locations upon the surface of the resonating element that are defined by boundaries that are congruent with areas of the resonating element that are subject to substantially uniform levels of stress when the gyroscope is rotationally stationary. Alternatively, the areas to which the actuator conductors are applied are demarcated by at least one stress gradient line that defines an area of substantially uniform stress present in the resonating element when the gyroscope is rotationally stationary. Essentially, the edges of the actuator conductors are congruent with the stress gradient lines that identify areas of substantially uniform stress in the resonating element. Often it is helpful for at least one of the actuator conductors to comprise two vertically symmetrical halves. These symmetrical halves are electrically isolated from one another and are independently electrically connected to a drive circuit that is constructed and arranged to apply a predetermined sequence of voltage signals to the resonating element through the actuators so as to impose a predetermined mode of oscillation upon said resonating element.

Placement of the pick-off conductors at the nodes of the resonating element ensures that the pick-off conductors will sense a net voltage signal of substantially zero when the gyroscope is rotationally stationary. But where due to geometric or voltage response discontinuities the net voltage signal sensed by the pick-off conductor when the gyroscope is rotationally stationary is not substantially zero, a balancing conductor may be applied to the surface of the resonating element in conductive communication with the pick-off conductor. Balancing conductors are arranged and constructed to zero any net voltage signals sensed by the voltage pick-off conductor when the resonating element of the gyroscope is rotationally stationary.

The resonating element may be any of a number of suitable shapes. Specific examples of resonating elements include, but are not limited to, cylinder-, ring-, and bar-shaped structures. The bar-shaped structures that may be used as a resonating element have a polygonal cross section. One particular example of a suitable bar-shaped resonating element is a triangular prism having three longitudinal sides with each longitudinal side having applied thereto a conductive element. In this example, two of the three conductive elements are used as pick-off conductors and the third is the actuator conductor. Another example of a suitable resonating element is a curvilinear axi-symmetric shell fashioned from a piezoelectric material.

The present invention may also be adapted for use with an angular rate sensing gyroscope of a type comprising a ring suspended from a support structure in a magnetic field by a plurality of leg members. This ring shaped resonating element is capable of vibrating at a resonant frequency that is defined by a plurality of vibratory nodes and anti-nodes as is more completely described below. The ring is further provided with a plurality of pick-off conductors that are arranged to sense electrical currents indicative of the rate of rotation of the gyroscope. These rotation indicating currents are induced in the pick-off conductors by movement of the ring and conductors through the magnetic field when the ring is deflected by rotation of the gyroscope. A plurality of actuator conductors are also arranged on the ring so as to pass currents through the magnetic field, thereby inducing resonant vibrations in the ring. In such a rate sensing gyroscope, the present invention embodies an improvement which comprises supporting the ring from a plurality of pairs of leg members. The leg members. are located adjacent to and symmetrically bracket the nodes of the ring. Pick-off conductors are arranged upon the leg members so as to form a loop, each pick-off conductor being applied down one of the leg members of a pair of leg members, across the portion of the ring intermediate the pair of leg members, and up the remaining leg member of the pair of leg members. This arrangement advantageously centers the portions of the pick-off conductors on the ring symmetrically about the respective nodes of the ring. Likewise, a plurality of actuator conductors are arranged in a loop, being disposed down a leg member of a first pair of leg members, along the ring intermediate the first pair of leg members and a second pair of leg members, and up a leg member of the second pair of leg members nearest the first pair of leg members. This arrangement also permits the actuator conductors to be centered symmetrically about the respective anti-nodes of the ring. The respective conductor loops formed by the pick-off and actuator conductors are, in turn, electrically connected to circuit means for operating the gyroscope.

In this embodiment of the present invention, each node and anti-node of the ring may be provided with a pick-off conductor or actuator conductor, respectively. However, there is no requirement that each of the nodes and anti-nodes have a conductor associated therewith. Furthermore, it may be desirable to extend the pick-off conductors and actuator conductors around substantially the entire circumference of said ring, though again there is no such absolute requirement In a tuning fork type angular rate sensing gyroscope composed of vibrator components which include a pair of parallel piezoelectric drive elements and a pair of parallel piezoelectric sensing elements joined together in respectively orthogonal planes, a plurality of leads electrically connected to the drive and detection elements, and a plurality of lead terminals electrically connected to the leads, a voltage pick-off conductor according to the present invention is disposed on the surfaces of each of the sensing elements. These pick-off conductors are arranged and constructed to sense stress-induced voltage signals outputted by the resonating element that is indicative of a rate of rotation of the angular rate sensing gyroscope. The pick-off conductors are applied to areas of the surface of the sensing elements that are subject to substantially zero stress when the angular rate sensor is rotationally stationary The voltage pick-off conductors provide electrical pathways from the sensing elements to the leads.

In another embodiment of the present invention, a resonating element having a polygonal cross-section has a predetermined number of improved conductive elements applied to the sides or faces thereof. The conductive elements are applied to the resonating element at areas of the sides or faces that are subject to drive motion stress which, when differentially sensed, is zero when angular rate sensing gyroscope is rotationally stationary. The conductive elements of this embodiment may further be provided with a voltage balancing conductor applied to the resonating element in electrical communication with the conductive elements so as to zero net voltage signals sensed by said conductive elements when the angular rate sensing gyroscope is rotationally stationary. It is important to note that differential sensing using conductive elements that are applied to substantially the entire length of the resonating element tends to damp out uniformly applied disturbances to the resonating element such as vibrations and magnetic fields.

Another manner of ensuring that a resonating element will oscillate in a desired mode is to physically damp out unwanted modes of oscillation. This may be accomplished by altering the geometry of the resonating element at predetermined locations upon the element. This manner of physical damping of oscillations is particularly, but not exclusively, applicable to axi-symmetric type resonating elements such as the ring and the cylinder-shaped elements. With regard to the ring- and cylinder-shaped resonating elements, the specific means of physically damping out unwanted modes of oscillation may comprise thickening the walls or cross sections of these resonating elements at the anti-nodes thereof.

Rate sensing gyroscopes are more accurate when the piezoelectric material of the resonating element has a uniform voltage response. A method of improving the uniform voltage response of a piezoelectric resonating element at a predetermined location of a solid resonating element having first and second opposing surfaces begins with the step of applying a thick or thin film conductor to the entire first surface of the resonating element. Next, an applied film conductor is applied to the entire second surface of the resonating element. The respective applied film conductors are then connected to a DC voltage source which applies a DC voltage of predetermined strength across the respective applied film conductors so as to uniformly modify the voltage response of the piezoelectric material of the resonating element over substantially the entire area of the piezoelectric material located between the respective applied film conductors. Finally, predetermined portions of the respective applied film conductors are removed to create a plurality of discrete applied film conductors arranged upon one or both of the surfaces of the resonating element as described above.

The useful life of a rate gyroscope comprising an axi-symmetrical resonating element is greatly improved by providing a plurality of applied film conductor leads which extend from each of the actuator conductors and pick-off conductors arranged upon the surface of the resonating element, to the base portion of the resonating element. The applied film conductor leads electrically connect the actuator conductors and pick-off conductors to circuitry for operating the angular rate sensing gyroscope. The use of applied film conductor leads in the place of fine wires reduces the amount of failures due to stress fracture of the wires.

These and other objects and advantages of the invention will become readily apparent as the following description is read in conjunction with the accompanying drawings wherein like reference numerals have been utilized to designate like elements throughout the several views wherever possible.

DETAILED DESCRIPTION OF THE INVENTION

The preferred embodiment of the present invention may be used in conjunction with various types of resonating elements used in rate gyroscopes. However, the preferred embodiment of the present invention will be most fully described as applied to an axi-symmetric shell 10 such as the shell illustrated in FIGS. 1, 3–5. Such a shell 10 may be caused to vibrate at a resonant frequency having a preferred mode of oscillation that is characterized by two nodal diameters (n=2) as illustrated in FIG. 2. It is to be understood that the improvements disclosed herein may have application outside of the specific embodiments described herein and are therefore not to be limited to just these embodiments.

Referring first to FIGS. 1, 3–5, the shell 10 of the preferred embodiment is generally cylindrical and has an axis of symmetry indicated at 12. The upper portion of the shell 10 is a hollow cylinder having a relatively thin wall 14 with an upper edge 16. The lower portion or stem 18 of the shell supports the upper portion of the shell 10 and is arranged to be received within a base 20. The base 20 is in turn arranged to secure the shell 10 to a sensor chassis (not shown) and provides electrical leads 22 which are connected by thin wires 23 to a plurality of conductors C that are applied to the surface of the shell 10 to the electrical components of the sensor. O-rings 24 on base 20 aid in isolating the shell 10 from external inputs such as vibrations that exist in the sensor chassis.

The shell 10 is fashioned of a piezoelectric material so that deformation or flexure of the shell 10 will produce a charge or voltage signal and a voltage signal imposed on the shell 10 will produce a deformation or flexure in the shell 10.

The preferred mode of oscillation for the axi-symmetric shell 10 is illustrated in FIG. 2. The upper edge 16 of the shell 10 oscillates at its lowest resonant frequency between a first nodal diameter indicated at 26 and a second nodal diameter indicated at 28. As can be seen in FIG. 2, at each nodal diameter 26, 28 the upper edge 16 of the shell assumes the shape of an ellipse. In this preferred mode of oscillation, the upper edge 16 of the shell 10 has four nodes N and four anti-nodes A. The anti-nodes A are located at the points of maximum deflection in the upper edge 16 of the shell 10, i.e. at the ends of the two nodal diameters 26, 28, and the nodes N are at the points of zero deflection. The nodes N and anti-nodes A are spaced at 45□ from one another, respectively.

Figure 5:
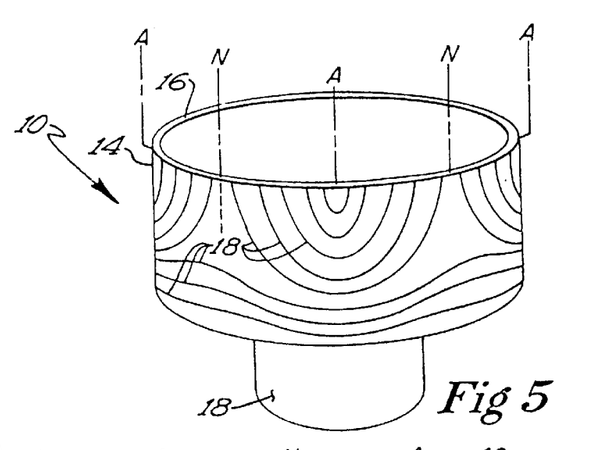
FIG. 5 is a schematic representation of the arrangement of stress gradients within the walls of the resonator illustrated in FIG. 4.

When the shell 10 oscillates at its resonant frequency as illustrated in FIG. 2, the piezoelectric material of the wall 14 directly at the nodes N is not flexed and subsequently, the charge signals sensed at the nodes N are substantially zero. Conversely, the piezoelectric material of the wall 14 at the ant-nodes A is flexed during oscillation at the resonant frequency and hence, a relative large charge signal may be produced. Understandably, stresses are produced in the wall 14 of the shell 10 during oscillation. These stresses are relative to the magnitude or amplitude of the deformations in the piezoelectric material of the wall 14 of the shell 10. FIG. 5 schematically illustrates how these stresses are arranged in an axi-symmetric shell 10 oscillating as illustrated in FIG. 2. Note that the actual stress patterns set up in the wall 14 of the shell 10 may differ from the schematic illustration of FIG. 5. It is to be understood that where the shell 10 is forced to oscillate in a mode having more than two nodal diameters (i.e. n>2), the pattern of the stresses set up in the wall 14 of the shell 10 will vary from those illustrated in FIG. 5. However, the principles of the present invention will yet apply.

In FIG. 5, lines 18 identify uniform stress gradients set up in the wall 14 of the shell 10 by the deformations of the shell 10 during oscillation. By definition, the deformations and subsequent stresses in the wall 14 at nodes N is substantially zero or, at the very least, is minimal with respect to the much greater deformations and stresses present at the antinodes A. The wall 14 at anti-nodes A is subjected to large deformations and hence, a great deal of stress, with the level of stress becoming greater approaching the upper edge 16 of the shell 10. The wall 14 of the shell 10 is essentially fixed at its base and free to be deflected near the upper edge 16 thereof. Near the base of the wall 14, the deformation of the wall 14 is exceedingly small and hence, so are resulting the stresses.

As can be seen in FIG. 5, for this mode of oscillation, i.e. n=2, the stresses in the piezoelectric material of the wail 14 of the shell 10 are minimal at the nodes N and maximized at the anti-nodes A. Though the preferred mode of oscillation is at n=2, it is to be understood that the shell may be made to oscillate in modes defined by more than two nodal-diameters, e.g. even number such as n=2, 4, 6, 8 . . . It is to be understood that the preferred embodiment of the present invention may be successfully applied with minimal alterations, to a resonator R oscillating in a stable mode having more than two nodal diameters.

FIG. 3 illustrates an axi-symmetric shell 10 having prior art conductors C applied directly to the wall of the shell 10 over relatively large areas of the wall 16. These relatively large conductors C are identical and encompass many distinct stress gradients 18 that are set up in the piezoelectric material of the wall 14 of the shell 10 by the oscillations of the shell 10. In this prior art conductor design, the conductors C are used for applying and receiving voltage signals to and from the piezoelectric material from which the shell 10 is fabricated. Typically, all or a portion of the interior of a shell 10 is coated with a grounded conductor G so as to create the requisite voltage differential across the wall 14 of the shell 10 when electrical signals are applied to the wall 14 of shell 10 by conductors C. The conductor G has fingers that wrap around to the exterior surface of the shell 10 and extend down between the respective conductors C. These fingers are grounded and act to electrically isolate respective conductors C from one another.

Figure 4:
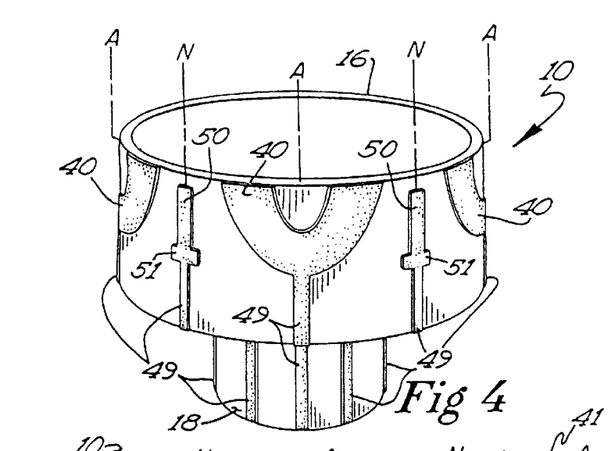
FIG. 4 is a perspective view of an axi-symmetric shell similar to that illustrated in FIG. 1 having actuators and pick-offs constructed and arranged according to the present invention applied thereto.
Figure 6:
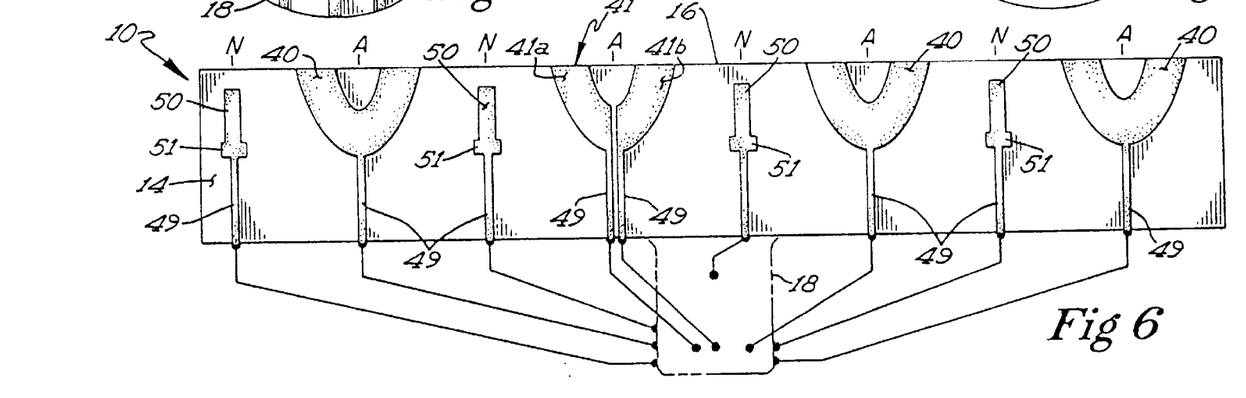
FIG. 6 is projection of the walls of the axi-symmetric shell illustrated in FIG. 4.

Rather than applying a uniform voltage across large areas of the wall 14 of the shell 10 as do the prior art conductors C, it has been found to be beneficial to utilize contoured actuators 40, as illustrated in FIGS. 4 and 6, to apply voltage signals to the shell 10. The actuators 40 are shaped or contoured to over-lie areas of the shell wall 14 which are normally subject to substantially uniform stresses. The outlines of each actuator 40 closely follow the contours of the stress gradient lines 18 as illustrated in FIGS. 4 and 5. Preferably, the outlines of the actuators.40 parallel and do not intersect the stress gradient lines 18.

The actuators 40 of the present invention are centered precisely on the respective anti-nodes A of the shell 10 and parallel the contours of the stress gradient lines 18. By placing the actuators 40 at the anti-nodes A which are spaced at 90□ from each other, the voltage signals applied to the shell wall 14 cause deformations in the shell 10 directly along the nodal diameters 26, 28. This arrangement imposes the maximum deformation per unit volt applied to the wall 14 of the shell 10. All signals are imposed upon the shell 10 by respective pairs of diametrically opposed actuators 40 along the respective nodal diameters 26, 28. Applying diametrically opposed voltage signals to the shell 10 effectively doubles the magnitude of the driving or corrective signals that are applied.

Voltage signals imposed on the shell 10 by the actuators include a component intended to impose the desired mode of oscillation upon the shell 10 and a component that is intended to correct any variations in the mode of oscillation of the shell 10 and bring it back to its desired mode of oscillation. Typically, at least one of the actuators applied to a resonating shell 10 is split into two electrically isolated crescents 41*a* and 41*b*. The halves 41*a*, 41*b* of the split actuator 41 are symmetrically arranged on either side of the anti-node A. The split actuator 41 is useful in applying unsymmetrical voltage signals to the wall 14 of the shell 10 so as to drive the oscillations of the shell 10 back to the desired mode of oscillation.

The specific size and location of each actuator 40 are directly related to both the impedance of the driving circuitry and the desired system Q value. The size and location of the actuators 40, 41 must be carefully arranged so that the power requirements of the actuators 40, 41 do not exceed the power that the drive circuitry of the gyroscope is capable of providing. In addition, the inherent Q value of the material of the resonating element or shell 10 and the desired Q value for the system as a whole must concurrently be taken into account when specifying the size and location of the actuators 40, 41.

The specific size and location of the actuators 40, 41 are in large part dependent upon the amount of power required to drive the shell 10 of the preferred embodiment in its preferred mode of oscillation. The geometry and rigidity of the shell 10 influences the amount of power required to cause the desired deflections and subsequent oscillations in the shell 10. In order to deflect the wall of a resonating element made of a piezoelectric material so as to impose a desired mode of oscillation, a voltage differential must be set up in the piezoelectric material. In the case of the shell 10, this requires that a voltage differential be set up between the actuators 40, 41 and a grounding conductor G applied to the inner surface of the shell 10. Generally speaking, the larger the actuator 40, 41 (i.e. the more surface area it has) the larger the voltage differential that may be set up across the shell wall 14. Both a desired system Q value and a desired power requirement may be achieved by independently varying the surface area and height of the actuators 40, 41.

Applying a uniform voltage signal to the shell wall 14 across numerous areas of substantially uniform stress may cause a significant decrease in the Q value of the oscillating shell 10. Ideally, the actuators 40, 41 would be placed on the shell wall 14 over an area that is subject to a substantially uniform stress when the shell 10 is oscillating. Applying the actuators 40, 41 over an area of substantially uniform stress minimizes the decrease in the system Q value. But since the stresses present in an oscillating shell wall 14 vary continuously, even an actuator 40, 41 having a small surface area will cover numerous discrete areas of substantially uniform stress. As the area of an actuator 40, 41 is increased, so does the number of areas of uniform stress covered by the actuator.

Likewise, the drop in the system Q value will also increase. Therefore it is preferred to minimize the area of the actuators 40,41. Consequently, it is important that the size of the actuators 40, 41 be carefully tailored to the power and Q value requirements of the gyroscope.

Along with the size of the actuators 40, 41, distance from the top edge 16 of the shell 10 to the actuators 40, 41 is also a significant factor in meeting the power requirements of the oscillating system. Placing an actuator 40, 41 closer to the top 16 of the shell wall 14 creates a mechanical advantage in that deformations induced nearer the top of the shell wall 14 are more easily propagated. For instance, placing the actuators 40, 41 nearer the bottom of the shell 10 increases the power requirement for driving the oscillations of the shell 10, i.e. the increased shell 10 stiffness near the bottom of the shell wall 14 requires a larger voltage differential to be set up across the shell wall 14 to impose the preferred mode of oscillation upon the shell 10. Conversely, where the actuators 40 are placed nearer the top 16 of the shell wall 14, the decreased rigidity of the shell wall 14 means that less power is required to impose the preferred mode of oscillation upon the shell 10. Therefore, where the power requirements of a shell 10 are high (as where the actuators 40, 41 are near the bottom of the shell wall 14) the actuators will be correspondingly large and where the power requirements of a shell 10 are low(as where the actuators 40, 41 are nearer the top of the shell wall 14), the actuators will be correspondingly small. It must be kept in mind that the actuators 40, 41 must be centered upon and symmetrical about, the respective anti-nodes A. Furthermore, the actuators 40, 41 of the present invention are applied to the resonating element 10 at predetermined locations upon the shell wall 14 that are defined by boundaries that are congruent with areas of the resonating element 10 that are subject to substantially uniform levels of stress, when the gyroscope is rotationally stationary. Alternatively, the areas to which the actuators 40, 41 are applied are demarcated by at least one stress gradient line 18 that defines an area of substantially uniform stress present in the resonating element 10 when the gyroscope is rotationally stationary. Essentially, the edges of the actuators 40, 41 are congruent with the stress gradient lines 18 that identify areas of substantially uniform stress in the resonating element.

The actuators' position with respect to the upper edge 16 of the shell 10 is preferably specified as a stress magnitude present at a particular stress gradient line 18. Given that the outlines of the actuators 40, 41 of the present invention are constrained to parallel the contours of the stress gradient lines 18, it is useful to designate the width of the actuators 40, 41 by the percent deviation from the stress gradient line that indicates the height of the actuators 40, 41. In the preferred embodiment of the present invention the height of the actuators 40, 41 is determined by the location of the stress gradient line 18 that identifies a stress magnitude of 75% of the maximum stresses present in the shell wall 14. The width of the actuators 40, 41 are such that the portions of the shell wall 14 underlying the actuators 40, 41 of the preferred embodiment are subject to stresses that deviate no more than 12% (±12%) from the stress gradient line 18 that identifies a stress magnitude of 75% of the maximum stresses present in the shell wall 14. As indicated above, both the height and the width of the actuators 40, 41 may be modified so as to meet the requirements of a specific application and therefore, the present invention is not to be limited to this preferred embodiment alone.

Where a high Q value for a resonating system is required and where the power requirements for driving the system are also high, a number of narrow actuators 40, 41 may be concentrically nested to provide a high system Q value while also providing sufficient surface area to satisfy the high drive power requirements. This alternate embodiment (not shown) would, for example, place a first actuator 40 or 41 at a height of 65% of the maximum stress present in the shell wall 14 and a second actuator 40 or 41 at a height of 80% of the maximum stress present in the shell wall 14. Each of these nested actuators would span an approximate range of ±5% of the stresses used to indicate the height of the actuator. While it is possible to nest any number of actuators in the manner described above, it is preferable to limit the number of nested actuators to no more than three and preferably to two. It is important to note that each level of actuator would be driven at different voltage levels to equally distribute the contributions to the vibration energy of the oscillating shell 10.

Driving and sensing circuitry (not shown) associated with the actuators 40, 41 generates the drive component of the voltage signals applied to the shell 10 and also utilizes voltage signals derived from the pick-offs 50 described below to generate the corrective component of the voltage signals applied to the shell 10 through the split actuator 41. This circuitry also outputs rate of rotation data derived from the pick-offs 50 of the gyroscope and is preferably capable of compensating for changes in the resonant frequency of the shell 10 or equivalent resonating element due to temperature fluctuations. Circuitry suitable for operating a gyroscope according to the present invention is disclosed in U.S. Pat. Nos. 4,479,098 and 4,578,650, which are commonly assigned with the present invention and which are hereby incorporated by reference.

A pick-off 50 constructed and arranged according to the present invention is an applied film conductor centered upon the nodes N of the shell wall 14. As the shell wall 14 at nodes N is, by definition, subjected to stress minimal and preferably, substantially zero during rotationally stationary steady state operation of the gyroscope (see FIG. 5), the pick-offs 50, centered exactly at the nodes N in an area of minimal or substantially no stress, will sense minimal or substantially no voltage signals from the piezoelectric material of the shell 10.

In practice however, it is difficult to form a pick-off 50 that is precisely centered at the node. And where the pick-offs 50 are not precisely centered on the nodes N, the pick-offs 50 will overlie portions of the shell wall 14 subject to stresses due to the oscillation of the shell 10. In these cases it is necessary to 'tune' the pick-offs 50 so that the pick-offs 50 will conduct a net voltage signal of substantially zero when the gyroscope is rotationally stationary. Tuning is accomplished by applying a balancing conductor 51 to the shell 10 wall 14 in electrical communication with pick-off 50 and trimming the conductor 51 to adjust the voltage signal sensed at the node by the pick-off 50. The size and placement of a balancing conductor 51 is carefully arranged to damp out uneven voltage responses output by the piezoelectric material. The use of a balancing conductor 51 helps ensure that a pick-off 50 will conduct a net voltage signal of substantially zero when the gyroscope is rotationally stationary.

When the gyroscope is rotationally displaced, the material of the shell wall 14 at the nodes N will be subjected to stresses and deformations, thereby causing the piezoelectric material of the wall 14 to emit voltage signals that are sensed by the pick-offs 50. As indicated above, the displacement of the nodes N with respect to the pick-offs 50 may be due to the rotation of the gyroscope or due to distortions in the shell 10 from environmental conditions such as temperature fluctuation. The control circuitry associated with the gyroscope described above uses the output of pick-offs 50 to determine both the rate and direction of the rotation of the gyroscope, to correct temperature induced fluctuations in the resonant frequencies of the shell 10, to correct temperature induced fluctuations in the voltage response of the piezoelectric material of the shell 10, and to ensure that the voltage signals for driving the oscillations and for correcting the oscillations are maintained in the proper phase relationship.

One benefit to using very thin pick-offs 50 at the nodes N is that the thin pick-offs 50 are more able to accurately sense the amplitude of the vibrations of the wall 14 of the shell 10 than the broad conductors C used as pick-offs in the prior art. Prior art conductors C average the voltage signals sensed over a relatively large area of the shell 10. These sensed voltages include signals due to rotation of the gyroscope and signals due to uneven voltage response in the piezoelectric materials of the shell 10 at the edge of the conductors C. As described above, wider and larger conductors C overlie more discrete stress gradients in the shell wall 14 with the result that large signals sensed at one location of the conductor C will tend to be cancelled by corresponding signals sensed at other locations of the conductor C. Conversely, thin pick-offs 50, because they are thin, are able to sense the voltage signals due to an amplitude of vibration at a more clearly defined and specific location on the wall 14 of the shell 10, thereby increasing both the accuracy and the precision of the gyroscope.

Another benefit to using both thin pick-offs 50 and contoured actuators 40, 41 in the arrangement of the pick-offs 50 and the actuators 40 illustrated in FIGS. 4 and 6, is that the actuators 40 and pick-offs 50 act as a physical filter for unwanted modes of oscillation. As described, the actuators 40, 41 impose deformations in the shell 10 only in the desired directions, i.e. along the desired nodal diameters 26, 28. In addition, the low impedance pick-offs 50 siphon off voltage signals due to deformation of the shell 10 at the nodes N, thereby reducing the propagation of voltage signals through wall 14 of the shell 10. The filtering action of the arrangement of the actuators 40 and the pick-offs 50 allows the shell to operate on a more efficient basis as fewer unwanted modes of oscillation need be damped out.

Another method for physically filtering out unwanted modes of oscillation involves altering the structure of the resonating element such as by augmenting the wall 14 of the shell 10 in a manner which causes the anti-nodes A to oscillate at a lower resonant frequency than the remainder of the shell 10. See FIGS. 7 and 8. This is accomplished by increasing the wall 14 thickness at the anti-nodes A, by adding crenellations (not shown) to the upper edge 16 of the wall 14 of the shell 10 at the anti-nodes, or by attaching weights W to the wall 14 of the anti-nodes N. The increased mass and altered geometry change the physical characteristics of the wall 14 at the anti-nodes A and increases the period required for that portion of the wall 14 of the shell to resonate through a single cycle, thereby predisposing the shell 10 to oscillate in its simplest mode of oscillation, in this case at n=2. Arranging and constructing the shell 10 in such a manner improves the efficiency of the vibrations of the shell 10 and increases its Q value.

Figure 14:
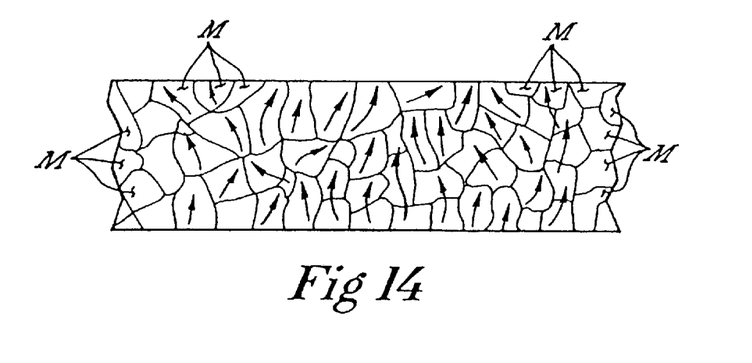
FIG. 14 is a schematic representation of individual grains of a piezoelectric material showing the random nature of the polarity of the grains.
Figure 15:
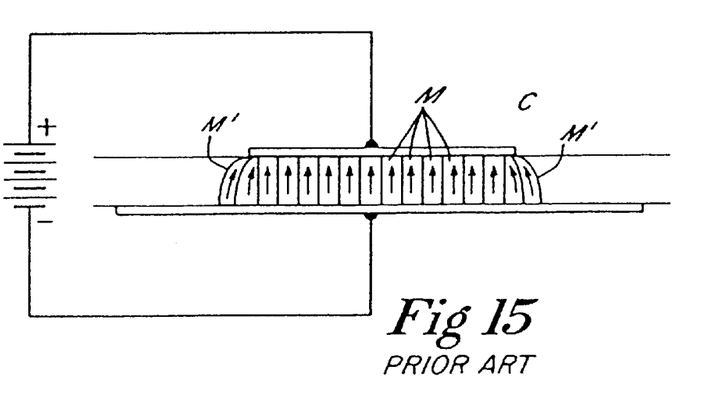
FIG. 15 is a schematic representation of a prior art method of polarizing the grains of a piezoelectric material.

In addition to the improvements upon the structure of the actuators 40 and pick-offs 50, improvements have been made in the accuracy and precision of the voltage response of the piezoelectric material of the shell 10. As illustrated in FIG. 14, a piezoelectric material, such as that from which a shell 10 may be fabricated, is comprised of discrete grains M of a piezoelectric material. Each grain M is only sensitive to deformations that occur in a specific direction. This polarity is indicated in FIG. 14 by the dark arrows within each grain. It is known to apply a strong DC voltage crosses the piezoelectric material between a conductor C and an inner, thin film ground connection G in order to bias the directions of sensitivity or polarity of the individual grains M of the piezoelectric material in a single direction as illustrated in FIG. 15. The uniformity of polarity in the grains M of piezoelectric material improves the voltage response of the piezoelectric material due to deformations of the material by creating a situation in which the collective voltage responses of the grains M are additive rather than destructive.

However, it is generally the case that the grains. $M^1$ of piezoelectric material near or at the edge of the conductors C across which the biasing DC voltage is applied will not receive the same bias as do the grains M of piezoelectric material located near the center of the conductors C. See FIG. 15. Because of this uneven biasing of the grains of piezoelectric material M, the voltage response of a shell 10 such as the prior art device illustrated in FIGS. 1 and 3 will exhibit an uneven voltage response. This uneven voltage response of the piezoelectric material may cause unwanted deformation of the shell 10 when voltage is applied to the shell 10 by the conductors C being used as actuators, thereby lowering the Q value of the shell 10 and inducing unwanted oscillations modes. In addition, the uneven polarization of the grains M may also result in inaccurate voltage readings from the conductors C being used as pick-offs, thereby corrupting the rotation data output by the gyroscope. What is more, because the voltage response of a piezoelectric material is proportional to the deformation or stress applied to the material, the uneven voltage response due to the uneven biasing of the grains M may become more pronounced as the stresses present in the shell 10 increase.

Figure 16:
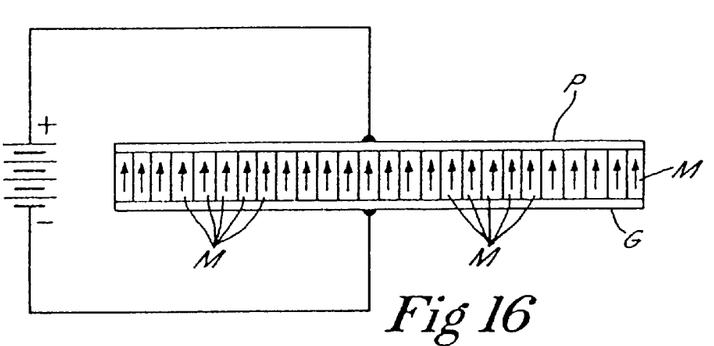
FIG. 16 is a schematic representation of the uniform polarization of the grains of a piezoelectric material according to the present invention.
Figure 17:
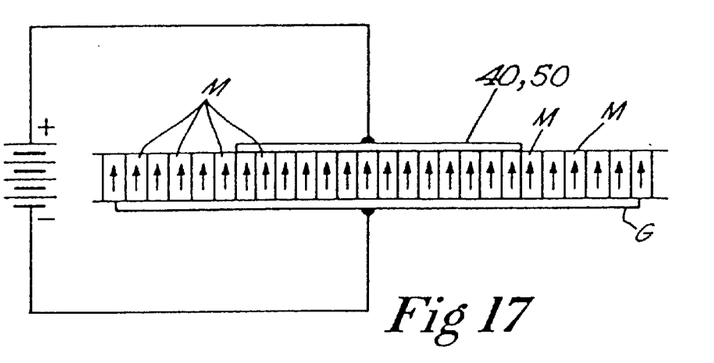
FIG. 17 is a schematic representation of the uniformly polarized grains of a piezoelectric material wherein a portion of the applied film conductor used to uniformly polarize the piezoelectric material has been etched away to form an actuator or pick-off according to the present invention.

FIGS. 16 and 17 illustrate an improved method for biasing the grains M of the piezoelectric material of the shell 10. In FIG. 16 it can be seen that the entire inner and outer surfaces of the shell 10 are coated with respective layers of conductors. In FIG. 16 the reference numerals 40 and 50 in addition to denoting the actuator 40 and pick-off 50 of a shell 10, indicate the thin film conductor material that is applied to the outer surface of the shell 10 and the reference character G indicates the grounded thin film conductor material applied to the inner surface of the shell 10 so as to create a voltage conduction path through the piezoelectric material of the shell 10. A suitably large DC voltage is applied across the piezoelectric material between the applied conductors 40, 50 and G to polarize of the respective grains M of the piezoelectric material in a desired direction (indicated by the arrows in FIGS. 14–17). Biasing the piezoelectric material of the entire shell 10 ensures that no irregularly biased grains $M^1$ as illustrated in FIG. 15 exist in the shell. Once the entire shell 10 has been suitably polarized, unnecessary thin film conductor material is removed as by chemical or abrasive etching to give the actuators 40 and pick-offs 50 their desired shape and locations as has been represented schematically in FIG. 17. As can be seen from FIG. 17, no irregularly biased grains $M^1$ remain in the piezoelectric material of the shell 10 at or near the actuators 40 or pick-offs 50, thereby ensuring a more uniform and predictable voltage response.

In addition to the improved biasing of the piezoelectric material of the shell 10, the gyroscope of the present invention has been made more reliable by improving the durability of the conductive leads that connect the actuators 40 and pick-offs 50 to the control circuitry of the gyroscope. In the prior art it was known to utilize very thin solid wires 23 soldered or compression bonded between the grounded applied film conductors G, actuators 40, and pick-offs 50 and the control circuitry, respectively. See FIG. 1. The use of solid wire conductors 23 has proved unreliable in that the wires have shown the tendency to break over time due to flexure of the wires. In addition, the material used to secure the wire conductors to the conductors C and the stiffness of the wire conductor itself have a tendency to reduce the Q factor of the shell 10 by changing the physical characteristics of the shell 10. As illustrated schematically in FIGS. 4 and 6, an applied film conductor 49 runs from the respective actuators 40 and pick-offs 50 down the side wall 14 of the shell 10 in order to make the requisite electrical connections to the drive circuitry Preferably the conductor paths or leads 49 emanating from the respective actuators 40 and pick-offs 50 will continue down the stem 18 of the shell 10 as shown in FIGS. 4 and 6. The applied film conductor material from which these improved conduction paths 49 are fashioned do not significantly affect the mode of oscillation of the shell 10. Furthermore, because all of the necessary electrical connections between the actuators 40, pick-offs 50, and the control circuitry are made on the stem 18 of the shell 10 or at least substantially near the base of the shell 10 where there is substantially no vibration, the electrical connections themselves are more likely to last longer because they are not subjected to repeated stresses which may eventually fracture a solid wire conductor 23.

Figure 9:
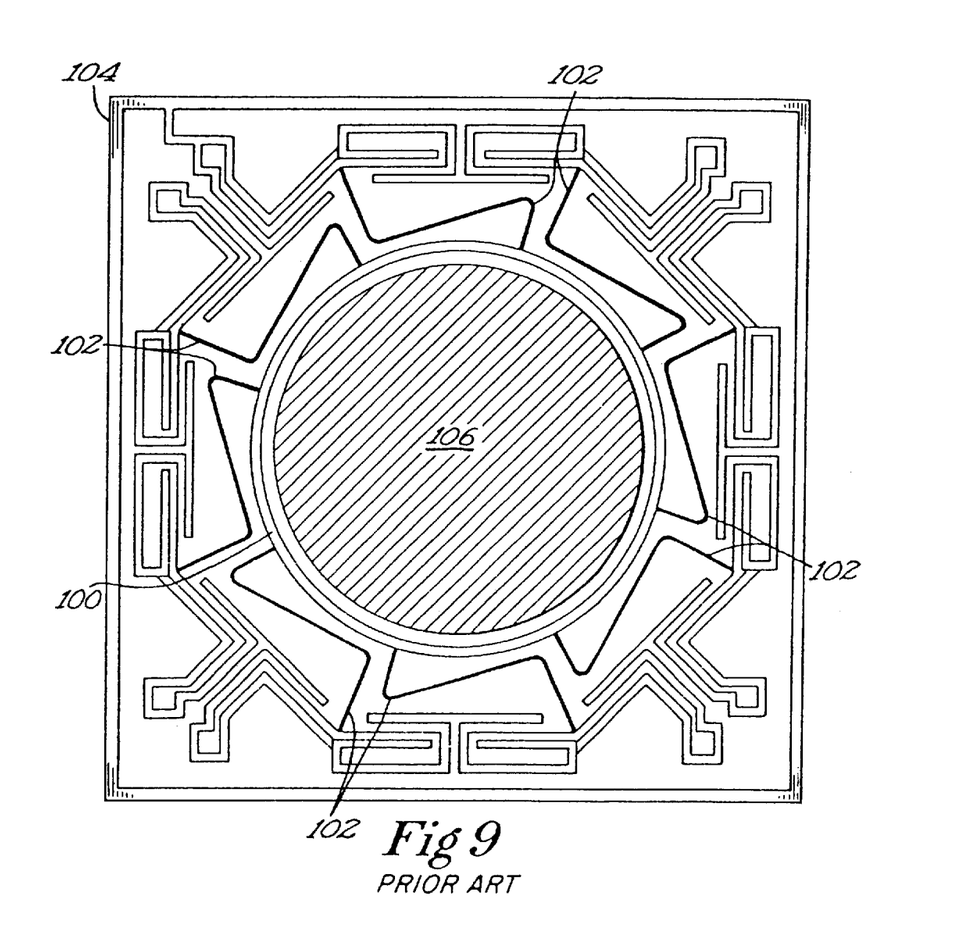
FIG. 9 is a plan view of a prior art resonating element of an oscillating ring rate gyroscope.
Figure 11:
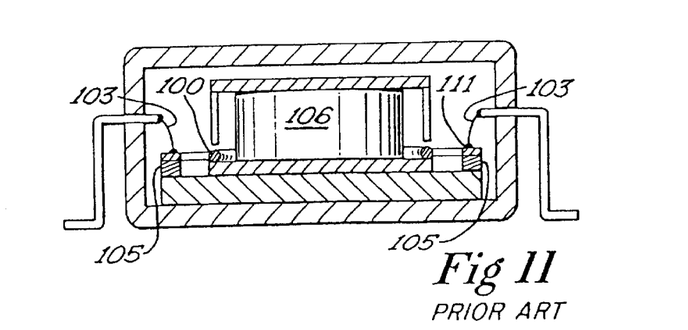
FIG. 11 is a sectional side view of the prior art oscillating ring rate gyroscope of FIG. 9.

An alternate embodiment of the present invention is described in conjunction with FIGS. 9–13. FIG. 9 illustrates the resonating element of a vibrating ring gyroscope of the prior art. This resonating element comprises a ring 100 which is supported from a support frame 104 at circumferentially uniformly spaced intervals by a number of radially compliant spokes 102. Typically, a resonating element 100 such as the one illustrated in FIG. 9 is manufactured from a single thin sheet of a relatively rigid material such as a crystalline silicon wafer of the type utilized in the manufacture of computer chips. The support frame 104 of this resonating element is typically mounted to a support structure 105 of a thermally matched material, in this case a glass material. See FIG. 11. A magnetic core 106, which is in this case cylindrical, is received through a central aperture formed by the ring 100. This core 106 imposes a strong magnetic field around and through the ring 100.

Figures 7, 8, 10:
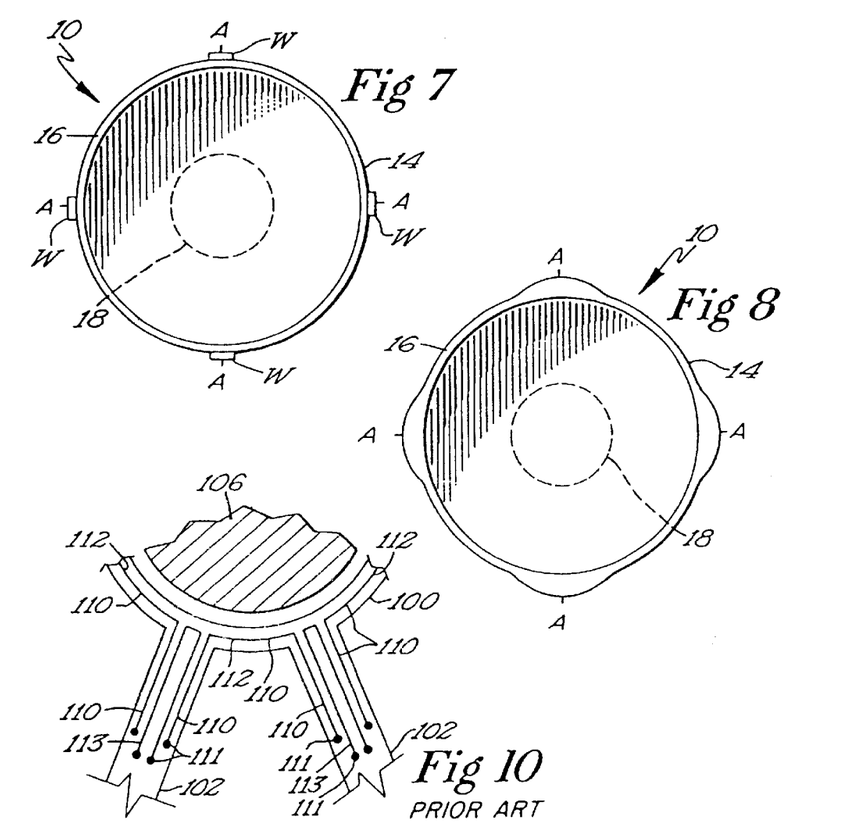
FIG. 7 is a top plan view of an axi-symmetric shell having weights applied to the walls at the anti-nodes of the shell.
FIG. 8 is a top plan view of an axi-symmetric shell having thickened walls at the anti-nodes of the shell.
FIG. 10 is a detailed schematic view of a pair of legs of the prior art oscillating ring rate gyroscope of FIG. 9.

With reference to FIGS. 9 and 10, current carrying 112 conductors are formed into the top side of the resonating element 100 by means of well known deposition techniques so as to form a plurality of identical conductor loops 110 that are uniformly spaced around the circumference of the ring 100 between adjacent spokes 102. The uniform conductor loops 110 are each comprised of a single conductor which passes down a spoke 102, around the perimeter of the ring 100, and back up an adjacent spoke 102. Conductive pads 111 permit bonding of the conductor loops 110 to a plurality of wires 103 which convey electrical currents between the conductor loops 110 and the drive and sensing circuitry (not shown) of the gyroscope. Each spoke 102 also has a neutral conductor loop 113 which acts to minimize capacitative coupling between adjacent conductor loops 110. Taking advantage of the principles of electromagnetism, currents passed through a selected current loop or loops 110 disposed around the ring 100 will react with the magnetic field created by the core 106 to cause a reactionary displacement of the ring 100 itself. Likewise, the displacement of the preferred mode of oscillation of the ring 100 by a rotational acceleration of the gyroscope will induce a current in a given conductor loop 110. Drive and sensing circuitry (not shown) of the type described above is used to impose the desired mode of oscillation upon the ring 100 and to sense voltages generated by rotation of the gyroscope.

Figure 12:
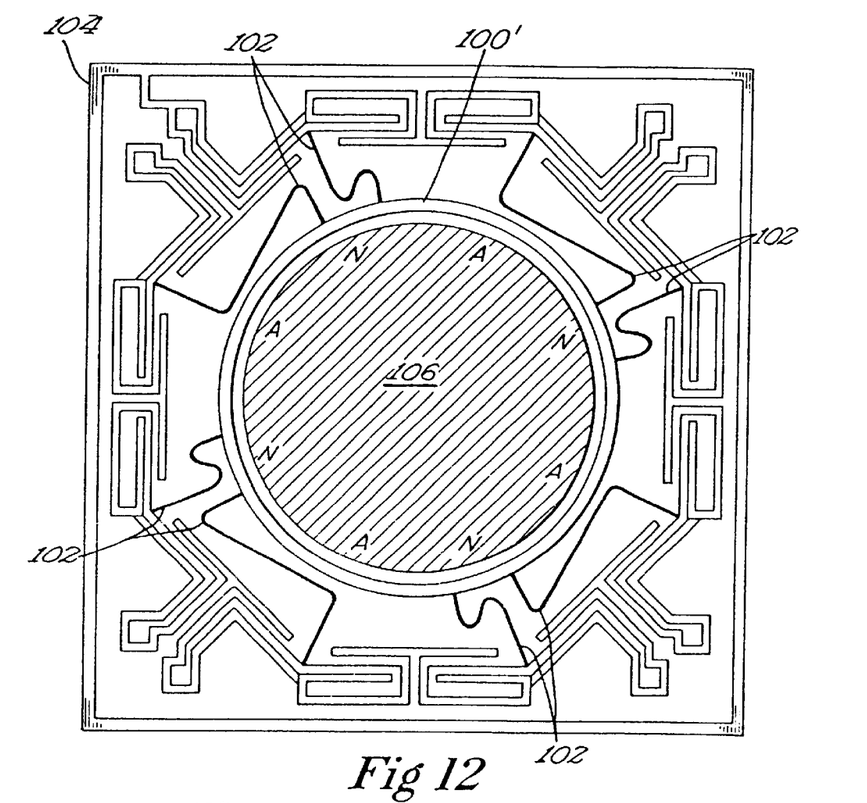
FIG. 12 is a plan view of a resonating element of an oscillating ring gyroscope arranged and constructed according to the present invention.

Conductor loops 110 of the prior art device illustrated in FIG. 9 are identical all around the circumference of the ring 100 and are used both as actuators and as pick-offs. The arrangement and the relative size of the actuator loops and pick-of loops in the prior art ring gyroscope illustrated in FIGS. 9 and 11 tend to create an undesirable amount of error in the signals sensed by the pick-off loops. Incorporating the principles of the present invention into a ring gyroscope yields a resonating element $100^1$ arranged as illustrated in FIG. 12; Respective pairs of spokes 102 symmetrically bracket the nodes N of the ring $100^1$, thereby ensuring that the pick-off conductor loops 110 are also positioned over the nodes N. Likewise, actuator conductor loops 110 are positioned symmetrically over the anti-nodes A of the ring $100^1$. In this manner and similar to the preferred embodiment of the present invention, the embodiment illustrated in FIG. 12 minimizes the effects of discontinuities in the magnetic field due to imperfections in the material from which the core 106 is manufactured.

Figure 13:
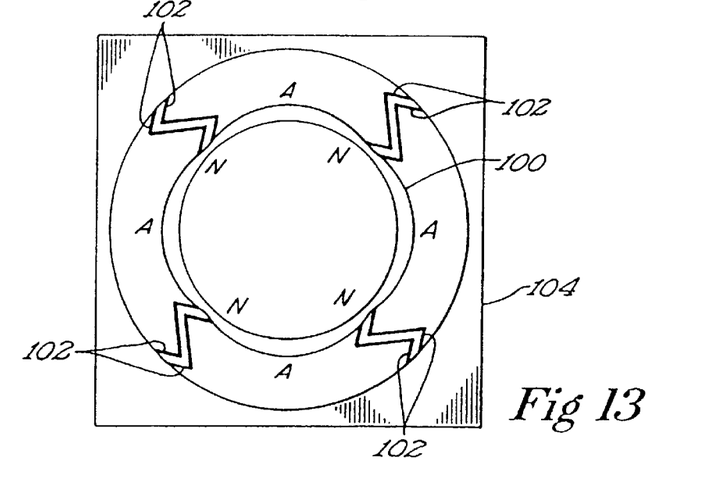
FIG. 13 is a top plan view of an oscillating ring gyroscope having thickened cross-sections at the anti-nodes of the ring.

FIG. 13 is an illustration of a resonating element similar to the ring 100 illustrated in FIG. 9. The ring $100^{11}$ of FIG. 13 has its walls thickened at the anti-nodes A of its preferred mode of oscillation in order to physically filter out unwanted modes of oscillation. This modification may also be incorporated within the ring $100^1$ illustrated in FIG. 12.

Figures 18, 19:
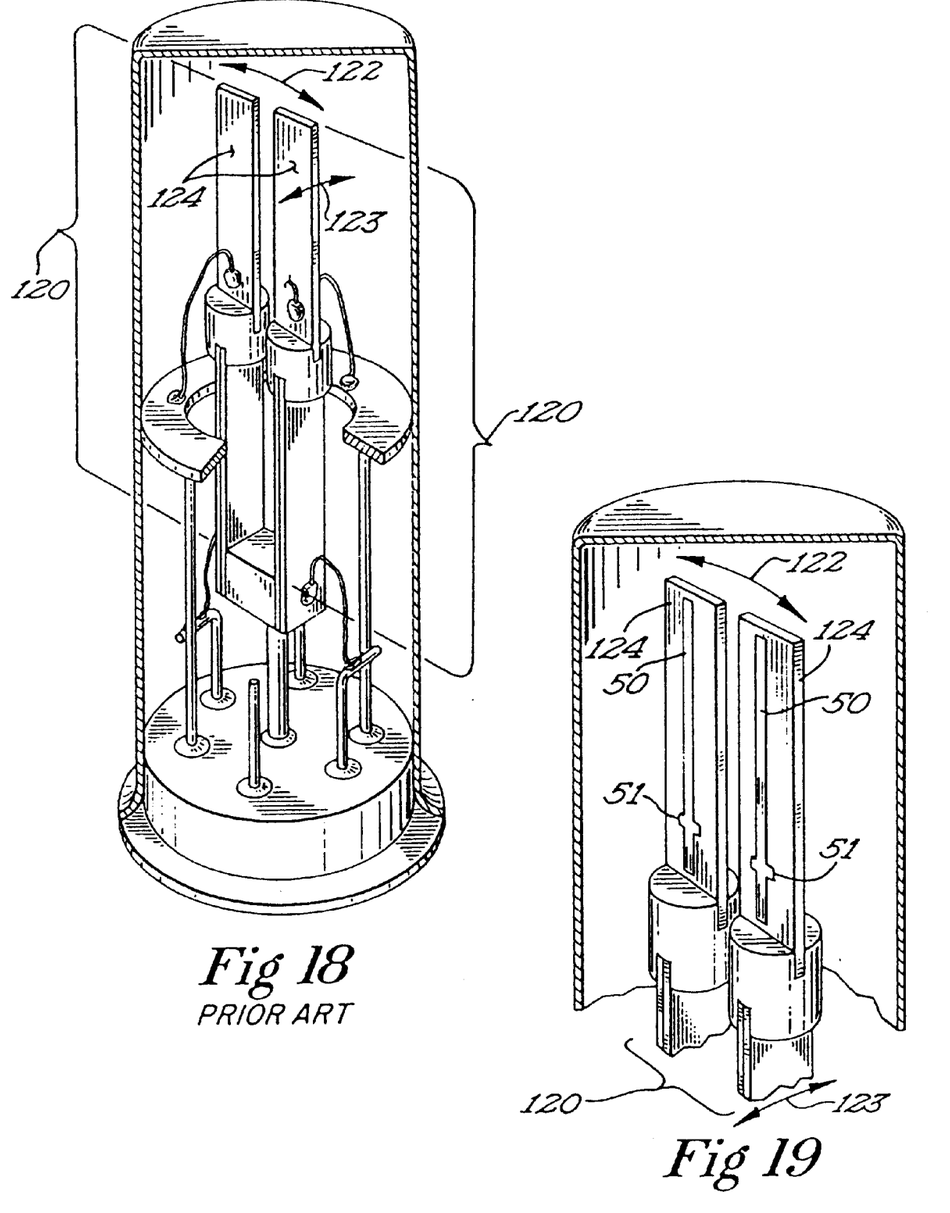
FIG. 18 is a partial cut-away perspective view of a prior art turning fork type of rate gyroscope.
FIG. 19 is a close up, partial cut-away perspective view of the sensing elements of a tuning fork type rate gyroscope having pick-off conductors constructed and arranged according to the present invention.

FIG. 18 illustrates a typical prior art tuning fork type of angular rate sensor such as that patented by Kimura in U.S. Pat. No. 5,014,554. This type of sensor operates by causing the tines 120 to oscillate as indicated by arrow 122. Rotation of the sensor causes the sensing elements 124 to flex in the direction indicated by arrow 123 and produce voltage signals that are proportional to the rate of rotation. However, the oscillation of the tines 120 in the plane indicated by arrow 122 also imparts at least some small amount of flexure to the sensing elements 124 in the plane defined by arrow 123 to the sensing elements 124. This small amount of flexure is sufficient to cause the piezoelectric materials from which the sensing elements 124 are made to produce a small voltage signal which erroneously indicates that there is some amount of rotation occurring.

FIG. 19 illustrates the application of the principles of the present invention to the prior art sensor of FIG. 18. Pick-offs 50 are placed at the very center of the beam sensing elements 124 so as to minimize voltage signals arising from flexure in the plane indicated by arrows 122. Though the placement of a thin pick-off 50 along the center of sensing element as illustrated in FIG. 19 should be sufficient to nullify most undesirable voltage signals, it may be necessary to balance the pick-off 50 using a balancing conductor 51. The balancing conductor 51 is an applied film conductor which is applied to the sensing elements 124 in electrical communication with the pick-offs 50 in such a manner as to nullify net voltage signals that are due to flexure of the sensing elements in the plane indicated by arrows 122. Portions of the balancing conductors 51 will be removed as by etching so as to ensure that the pick-offs 50 sense a net voltage of substantially zero when the gyroscope illustrated in FIG. 19 is rotationally stationary.

Figure 20:
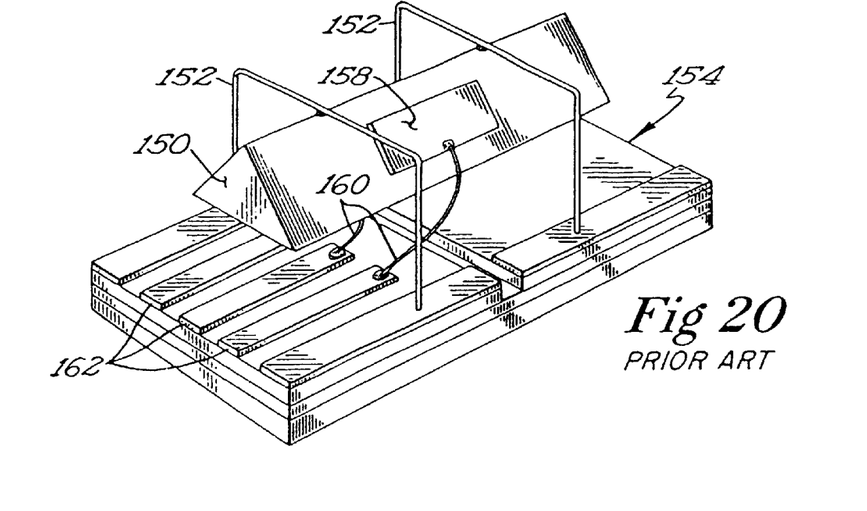
FIG. 20 is a perspective view of a bar type resonating element of a prior art angular rate sensing gyroscope.

FIG. 20 illustrates a prior art gyroscope patented in Japan by Murata Electric Corporation. In this device, the resonating element 150 is a piezoelectric bar. Though in the illustrated embodiment the resonating element 150 is in the form of an equilateral triangular prism, other elements having various polygonal cross-sections may also be used, including square and hexagonal bars. The resonating element 150 is suspended over a base 154 from a pair of support members 152 which are in this case wire arches. Conductive elements 158 are secured to each of the respective sides of the resonating element 150. Wires 160 connect the conductive elements 158 to a number of conductive pads 162 that electrically connect the wires 160 to the drive and sensing circuitry (not shown) used to operate the gyroscope.

Figure 21:
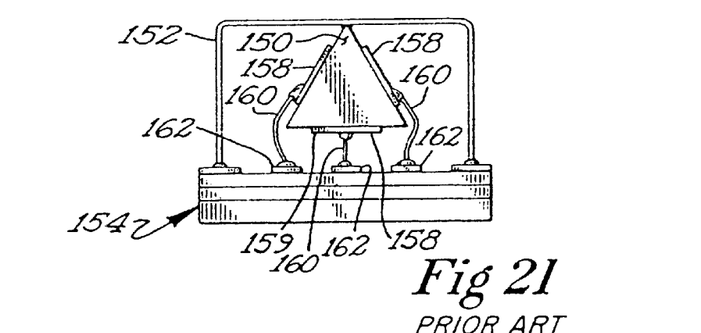
FIG. 21 is an end view of the prior art angular rate sensing gyroscope of FIG. 12.

The element 150 is made to oscillate in a preferred mode of oscillation by a drive element 158', which is in this case the lowermost element 150. See FIG. 21. The remaining elements 158" are used to sense the vibration and rotation of the gyroscope. When the gyroscope of FIGS. 20–21 is rotationally stationary, the sensing elements 158" should each sense the same voltage signals and should therefore report a net differential current output of zero. When the gyroscope is rotated about its sensitive axis, the sensing elements 158" sense a positive or negative net current output that is proportional to the rate of rotation of the gyroscope. But, as can be seen in FIGS. 12 and 13, conductive elements 158 occupy large portions of the respective forces of the element 150. As described above in conjunction with the shell 10 of the preferred embodiment of the present invention, applying a relatively large sensing element 158" over a relatively large surface area of a vibrating element 150 will decrease the Q factor of the vibrating system.

Figure 22:
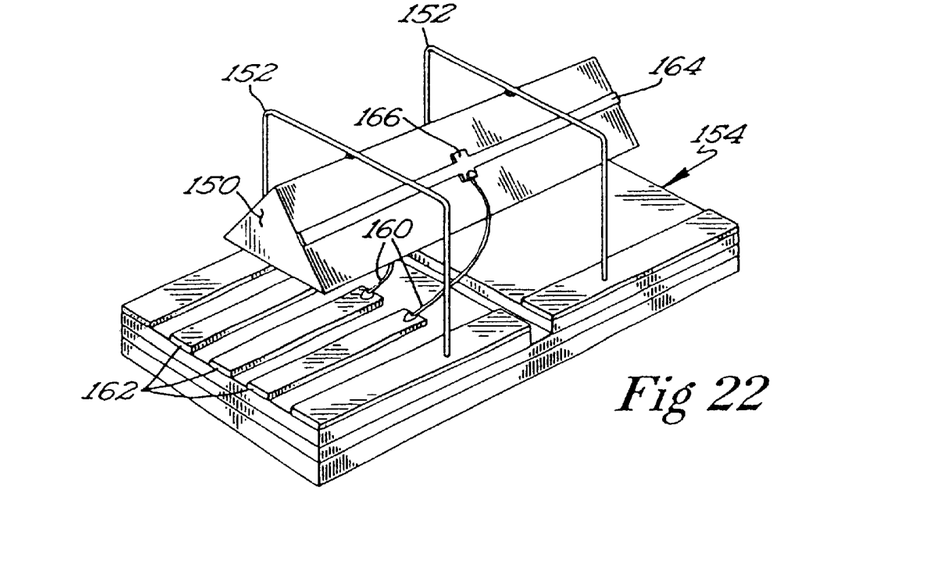
FIG. 22 is a perspective view of a bar type resonating element of an angular rate sensing gyroscope having pick-off conductors constructed and arranged according to the present invention.

Referring now to FIG. 22, the incorporation of the principles of the present invention may be seen as applied to a prior art gyroscope such as the one illustrated in FIGS. 20–21. The new conductive elements or pick-offs 164 are disposed in symmetrical locations, in this case along the center of the face of each of the sides of the prismatic resonating element 150. In order to ensure that pick-offs 164 sense a substantially net differential current output of zero when the gyroscope is rotationally stationary, a balancing conductor 166 maybe provided upon the surface of the resonating element 150. This balancing conductor 166 is electrically connected to the pick-off 164 and is carefully sized and located upon the resonating element 150 so as to cancel net differential voltage signals sensed by the pick-offs 164 when the resonating element 150 is oscillating in a rotationally stationary state.

This description is intended to provide specific examples of an preferred and alternative embodiments which clearly disclose the principles of the present invention. Accordingly, the present invention is not to be limited to just these described embodiments or to the use of the specific elements described herein. All alternative modifications and variations of the present invention which fall within the spirit and broad scope of the appended claims are covered.

What is claimed is:

1. In a gyroscope comprising a ring suspended from a support structure in a magnetic field by a plurality of leg members and wherein said ring is capable of vibrating at a given resonant frequency defined by a plurality of vibratory nodes and anti-nodes located upon said ring, said ring being further provided with a plurality of pick-off conductors arranged to sense electrical currents indicative of rotation of the gyroscope and induced therein by movement of said pick-off conductor through said magnetic field when said ring is deflected by rotation of said gyroscope, and a plurality of actuator conductors arranged upon said ring so as to pass currents through said magnetic field, thereby causing deflection in said ring to induce said resonant vibrations in said ring, an improvement comprising:

a) a plurality of pairs of leg members located adjacent to and symmetrically bracketing said nodes of said ring;

b) a plurality of pick-off conductors, each pick-off conductor disposed down one of said leg members of said pair of leg members, across the portion of said ring intermediate said leg members of said pair of leg members, and up the remaining leg member of said pair of leg members, each of said portions of said pick-off conductors disposed upon said ring intermediate said legs of said pairs of leg members being arranged symmetrically about one of said nodes of said ring;

c) a plurality of actuator conductors, each of said actuator conductors being disposed down a leg member of a first pair of leg members, across a portion of said ring intermediate said first pair of leg members and a second pair of leg members, and up a leg member of said second pair of leg members nearest the first pair of leg members, each of said portions of said actuator conductors disposed upon said ring intermediate said pairs of leg members being arranged symmetrically about one of said anti-nodes of said ring; and d) each of said plurality of pick-off and actuator conductors being arranged to form a conductor loop that passes through said magnetic field, each of said pick-off and actuator conductor loops being further electrically connected to circuit means for operating said gyroscope.

2. The improvement in the gyroscope of claim 1 wherein each node of said ring is provided with a short pick-off conductor and each anti-node is provided with a long actuator conductor.

3. The improvement in the gyroscope of claim 2 wherein said pick-off conductors and said actuator conductors extend around substantially the entire circumference of said ring.

4. The improvement in the gyroscope of claim 2 wherein the cross-section of said ring is thickened at said anti-nodes.

* * * * *